United States Patent
Schmitt

(10) Patent No.: US 7,371,303 B2
(45) Date of Patent: May 13, 2008

(54) FASTENING DEVICE FOR FASTENING SMALL COMPONENTS TO A MOUNTING SURFACE BY ADHESIVE BONDING

(75) Inventor: Klaus Gisbert Schmitt, Giessen (DE)

(73) Assignee: Newfrey LLC, Newark, DE (US)

(*) Notice: Subject to any disclaimer, the term of this patent is extended or adjusted under 35 U.S.C. 154(b) by 0 days.

(21) Appl. No.: 11/520,232

(22) Filed: Sep. 13, 2006

(65) Prior Publication Data

US 2007/0051718 A1 Mar. 8, 2007

Related U.S. Application Data

(63) Continuation of application No. PCT/EP2005/002295, filed on Mar. 4, 2005.

(30) Foreign Application Priority Data

Mar. 15, 2004 (DE) .................... 10 2004 012 786

(51) Int. Cl.
*H05B 6/14* (2006.01)
*H05B 6/40* (2006.01)

(52) U.S. Cl. .................. 156/273.9; 219/10.57
(58) Field of Classification Search ................. 219/659
See application file for complete search history.

(56) References Cited

U.S. PATENT DOCUMENTS

| 3,783,344 | A | * | 1/1974 | Ono et al. ............... 361/144 |
| 3,935,950 | A | * | 2/1976 | Burch ..................... 414/744.3 |
| 4,355,222 | A | * | 10/1982 | Geithman et al. .......... 219/633 |
| 4,853,075 | A | | 8/1989 | Leslie et al. |
| 5,414,247 | A | | 5/1995 | Geithman et al. |
| 5,505,811 | A | * | 4/1996 | Welch et al. ............... 156/358 |
| 6,221,195 | B1 | | 4/2001 | Lubert et al. |
| 2003/0010441 | A1 | | 1/2003 | Bremont et al. |
| 2004/0025331 | A1 | | 2/2004 | Schmitt et al. |

FOREIGN PATENT DOCUMENTS

| DE | 2233412 | 1/1974 |
| DE | 20300624 | 3/2003 |
| EP | 0927091 | 7/1999 |
| GB | 1421470 | 1/1976 |

OTHER PUBLICATIONS

International Search Report dated Jul. 11, 2005.

* cited by examiner

*Primary Examiner*—Richard Crispino
*Assistant Examiner*—Emily A Chimiak
(74) *Attorney, Agent, or Firm*—Harness, Dickey & Pierce, P.L.C.

(57) ABSTRACT

A fastening device for fastening a small component, in particular a stud provided with an adhesive flange, to a mounting surface using a heat-activated adhesive that creates an adhesive bond between the component and the mounting surface, has an induction coil to heat the component and/or the adhesive and a holding mechanism which holds the component while the fastening device moves to the bonding position. On the side facing the mounting surface is a bearing surface for the component toward which the component can be brought from outside. The holding device can be advanced to the component by the induction coil and has an electromagnet for generating a holding force that is directed toward the bearing surface.

30 Claims, 7 Drawing Sheets

FASTENING DEVICE FOR FASTENING SMALL COMPONENTS TO A MOUNTING SURFACE BY ADHESIVE BONDING

CROSS-REFERENCE TO RELATED APPLICATIONS

This application is a continuation of International Application No. PCT/EP2005/002295, filed Mar. 4, 2005, which claims priority to German Patent Application No. 10 2004 012 786.7 filed Mar. 15, 2004. The disclosures of the above applications are incorporated herein by reference.

FIELD

The invention relates to a fastening device for fastening small components, in particular studs provided with an adhesive flange, to a mounting surface using a heat-activated adhesive that creates an adhesive bond between the component and the mounting surface, wherein the fastening device has an induction coil to heat the adhesive zone and a holding mechanism which holds the component while the fastening device moves to the bonding position.

BACKGROUND

Fastening devices of the specified type are used to automatically transport small components such as mounting studs, drain plugs, fasteners, pegs and the like to a mounting point on a mounting surface such as a motor vehicle body and hold the component there until the adhesive bond is established, and to heat the heat-activated adhesive to the required temperature. The adhesive providing the adhesive bond may be located either on the component or on the mounting surface.

From EP 0,927,091 B1 is known a device of the specified type for automatically setting and bonding mounting studs coated with hot-melt adhesive. The device has a housing with a stud catching station and a stud feed channel which is connected to a feed tube through which the mounting studs are conveyed by compressed air into the housing and the feed channel. Located at the end of the feed channel is a cylinder, equipped with an induction coil, that can be placed on the mounting surface and into which the mounting stud can be introduced with the disk flange first. Provided above the cylinder is a device with a plunger that can move into the cylinder, which presses the mounting studs in the cylinder onto the fastening position on the mounting surface. In one design, the plunger has a conical recess for centering the stud end. In another design, the plunger is provided with a gripper that guides the stud. This known device requires a relatively large amount of clearance at the fastening point since the inside diameter of the cylinder arranged within the induction coil must be larger than the outer diameter of the mounting stud's disk flange.

Also known, from DE 203 00 624 U1, is a portable stud gluing device with a portable electric power supply unit and a hand unit which are electrically connected to one another, wherein the hand unit has an inductor mechanism for generating heat. The hand unit of this device has a stud receiving device that carries a toroidal, cylindrical ferrite core that is enclosed by an induction coil. The shank of the stud is inserted in the stud receiving device and is held therein by a permanent magnet attached to a spring. The stud flange, which is located outside the stud receiving device, rests at a distance from the end face of the ferrite core and is pressed against the ferrite core by force applied manually to the hand unit during the fastening process.

SUMMARY

An object of the invention is to create an improved fastening device for automatically bonding small components. In particular, the device should require only a small amount of space at the bonding point. Furthermore, the device should permit rapid heating of the bonding zone and be removable from the bonded component without the use of force after the adhesive bond has been established. The fastening device according to the invention has, on its side facing the mounting surface, a bearing surface for the component toward which the component can be brought from outside, and the holding device has means for producing a holding force that is directed toward the bearing surface and is transmitted to the component.

The fastening device according to the invention has the advantage that it can be made very compact, since no opening is present for the component to pass through. The device's space requirement at the fastening point is thus small. An additional advantage is that the part of the component adjacent to the fastening zone that is to be heated can be brought into the immediate vicinity of the induction coil, so that especially effective and thus rapid heating of the fastening zone can be achieved. Using the holding device to press the component against the contact surface achieves secure chucking of the component in the fastening device by simple means, with the result that the component remains in an exactly defined position relative to the fastening device, even when transport motions are rapid, and precisely positioned fastening of the component is ensured. Moreover, this allows for adequate clearance for motion between the fastening device and the component so that the fastening device can be separated from the component after the end of the bonding process without the use of force.

It is especially advantageous when the holding device has an electromagnet that creates the holding force to hold the component in place. When the component is to be released from the holding device after bonding, it suffices to turn the electromagnet off. A mechanically simple design of the invention provides that the electromagnet is embodied as part of the holding device through the induction coil, in that the induction coil can be connected to a DC voltage source during the holding phase. In the fastening position, the component can be pressed against the mounting surface by the fastening device itself, so that the induction coil can then be disconnected from the DC voltage source and connected to an AC voltage source. According to the invention, the induction coil has a centrally located through-opening extending in the direction of the coil axis, where the wall of the opening is composed of a magnetically soft material as a shield tube. The shield tube directs the magnetic field toward the area of the stud that is to be heated and protects the portions of the stud located in the opening, for example the stud shank, and the parts of the holding device that consist of electrically or magnetically conductive materials, from inductive heating and/or magnetic oversaturation. Thermocouples for monitoring the temperature of the component can also be located inside the shield tube, protected from the alternating magnetic field of the induction coil.

To guide components that project into the opening, such as mounting studs, a guide element that works together with the component can be arranged in the opening. If the induction coil is used as an electromagnet, the guide element can be made of a magnetically soft material and be designed to concentrate the magnetic field that acts on the component during the holding phase. The guide element can preferably be moved out of the shield tube opening by an actuating device. This can be useful to increase the effectiveness of the shield tube during the induction phase or to remove the guide element from the bonded component prior to raising the fastening device away from the component. Movability of the guide element also makes it possible to adapt the position of the guide element to components of different lengths. If the guide element is made of a nonconductive and weakly magnetic material, especially plastic, it can also be arranged at a fixed position in the opening of the induction coil or in the shield tube.

According to another embodiment of the invention, the guide element can be designed as an electromagnet so that it can serve to grip and hold the component. In order to move the guide element, it can be fastened to the end of the piston rod of an actuating cylinder that is arranged coaxial to the induction coil and rigidly connected thereto. The actuating cylinder is preferably operated pneumatically.

According to another embodiment of the invention, the holding device can have a pincerlike gripper whose gripper arms are designed such that they project into the opening of the induction coil or can be moved through it. The gripper can be arranged on the guide element, and it can be moved along the coil axis together with the guide element by the actuating device. The gripper arms, which move transverse to the coil axis, can be pressed into a chucking position in a simple manner by spring force. However, this has the disadvantage that a force spreading each of the gripper arms apart must be overcome in gripping and releasing the component. Thus, an embodiment according to the invention wherein the gripper arms can be moved back and forth between an open position and a closed position by means of a drive is more advantageous, although costlier. The gripper can then be applied to and removed from the component without the use of force.

Another embodiment of the invention provides that the induction coil and the holding device form an assembly that is arranged in a housing and is supported therein so as to be movable along the coil axis between two end positions that are preferably limited by stops. This makes it possible to position the fastening device with the housing and to use the assembly in that position to perform movements suitable for gripping a component or moving a component to the mounting surface. The relative motion of the assembly and the housing can be accomplished either actively using a drive, or passively from outside by moving the housing while overcoming a spring holding the assembly in an end position. The drive can be either an electric or magnetic linear motor.

The housing can be either rigidly or movably attached to a robot arm, by which means the fastening device can be moved to various fastening positions. According to the invention, a movable connection between the housing and the robot arm can consist of a carriage fastened to the housing that is movable in a carriage guide parallel to the coil axis, wherein the carriage guide is arranged on the robot arm.

An additional advantageous embodiment provides that the housing is supported on the robot arm so as to be rotatable about an axis arranged transverse to the coil axis, and can be moved to different angular positions and locked in those positions by a rotary drive. In this case, a device for feeding components can be provided on the robot arm and the fastening device can be pivoted to a loading position facing the feed device, where one component at a time can be gripped by the holding device. This makes it possible in an especially simple manner to execute a rapid loading operation that can be executed while moving to the next fastening position.

DRAWINGS

Additional details and features of the invention are evident from the description below of individual example embodiments which are shown in the drawings. Shown are:

Figure is a first embodiment of a fastening device according to the invention for automatically bonding studs to a mounting surface, with a housing that is attached to a robot arm in a longitudinally movable manner;

DETAILED DESCRIPTION

Figure 1:
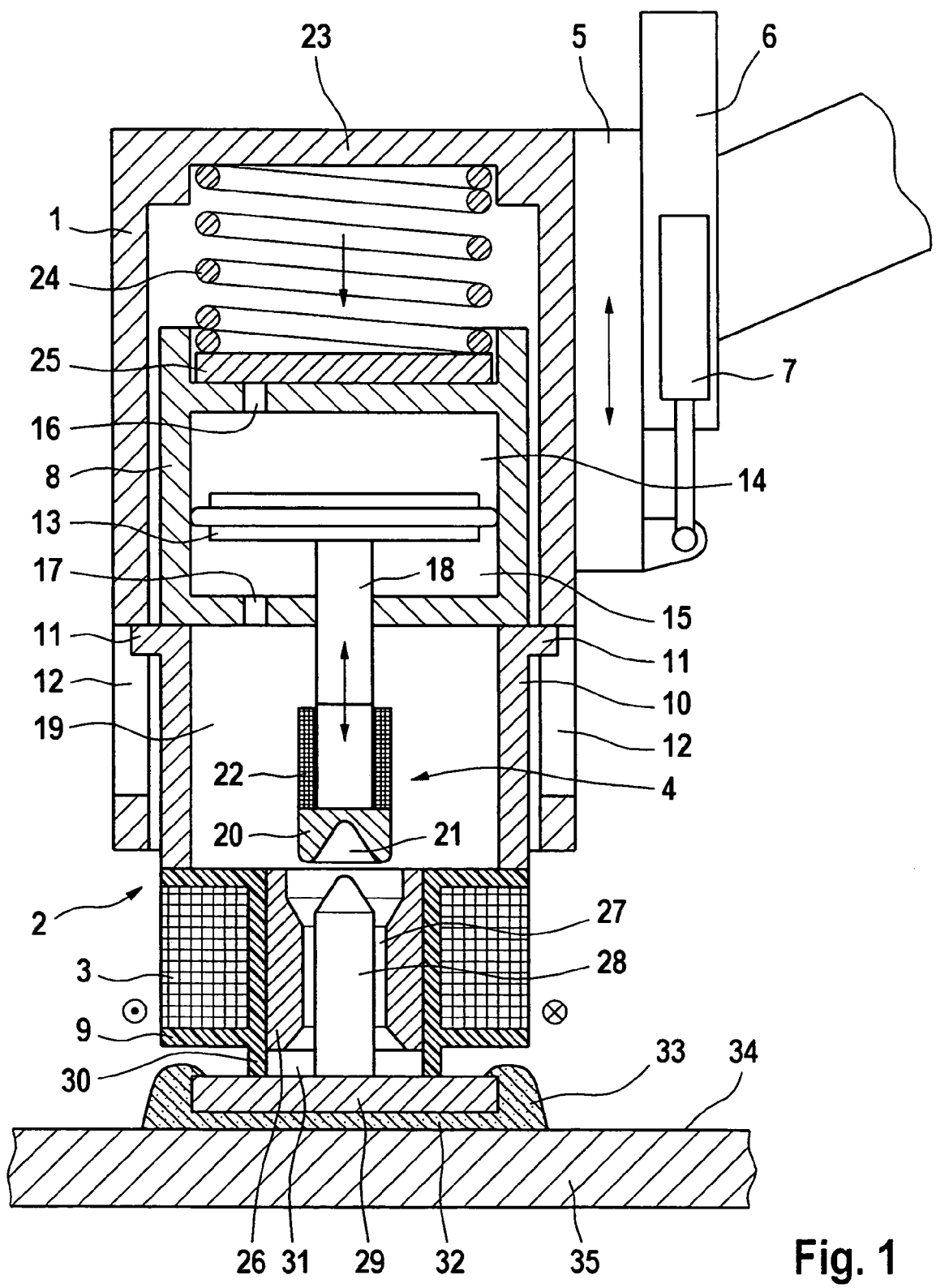

The fastening device shown in FIG. 1 is comprised of an outer cylindrical housing 1 and, supported therein in a longitudinally movable manner, an assembly 2 that contains an induction coil 3 and a longitudinally movable holding device 4. The housing 1 is fastened to a carriage 5 that is supported in a longitudinally movable manner on a carriage guide 6 extending parallel to the longitudinal axis of the housing 1. The carriage 5 can be moved, and also fixed in place at defined locations, by an actuating cylinder 7 arranged on the carriage guide 6 on a robot arm.

The assembly 2 consists of an actuating cylinder 8, a coil carrier 9, and an intermediate member 10 connecting the two, all of which are rigidly joined together. Located on the intermediate member 10 are two diametrically opposite guide pins 11, each of which engages a longitudinal slot 12, parallel to the housing axis, in the wall of the housing 1 and prevents rotation of the assembly 2 relative to the housing 1. In addition, the guide pins 11 and the ends of the guide slots 12 define the two possible end positions of the assembly 2 in the housing 1.

The actuating cylinder 8 is located on the upper end of the assembly 2 located inside the housing 1. It contains a piston 13 that separates two working chambers 14, 15. The working chambers 14, 15 are connected by pressure connections 16, 17, and by pressure lines that are not shown, to a valve device supplied with compressed air. The working chambers 14, 15 can be connected alternately to the compressed air source or to the atmosphere by means of the valve device. A piston rod 18 extends from the piston 13 through the wall of the actuating cylinder 8 adjacent to the intermediate member 10 into a chamber 19 enclosed by the intermediate member 10. At its free end, the piston rod 18 carries a guide element 20 that has a conical recess 21 in its end face. The guide element 20 is designed as an electromagnet and carries a coil 22 that can be connected to a DC voltage source by lines that are not shown.

Arranged between the actuating cylinder 8 and a bottom 23 of the housing 1 is a compression spring 24 that is supported on the actuating cylinder 8 by a pressure sensor 25. The compression spring 24 attempts to push the assembly 2 into its lower position, extended from the housing 1, where it is held in place by the guide pins 11.

The induction coil 3 is arranged on a coil carrier 9 located outside the housing 1. The coil carrier 9 is made of a nonconducting insulating material and has the form of a cylinder with two annular walls that extend radially outward, between which the induction coil 3 is held. Located in the cylinder is a shield tube 26 made of magnetically soft material, whose bore 27 serves to accommodate a stud 28, with an adhesive flange 29, which is to be bonded. The shield tube 26 has a smaller axial length than the cylinder of the coil carrier 9, so that the lower end of the coil carrier 9 forms a support ring 30 that extends beyond the shield tube 26 and on which the adhesive flange 29 is supported. The air gap 31 thus created between the shield tube 26 and the adhesive flange 29 improves the effectiveness of the shield tube 26 and provides thermal insulation from the flange 29.

FIG. 1 shows the described fastening device essentially in an operating position, wherein the adhesive flange 29 of the stud located in the fastening device has been heated enough that the adhesive present in an adhesive zone 32 has melted and has been partially forced outward to form an adhesive bead 33. In this process, the adhesive flange 29 is pushed against a mounting surface 34 of a workpiece 35 by the compression spring 24 via the assembly 2. The motion toward the workpiece 35 of the carriage 5, and the housing 1 attached thereto, compresses the compression spring 24 to such a degree that the force measured by the pressure sensor 25 corresponds to the desired pressure on the adhesive flange 29. The holding device 4 with the guide element 20 and the coil 22 are moved to a position outside the shield tube 26 away from the stud 28 by the application of pressure to the working chamber 15, so that they are not heated by the alternating magnetic field of the induction coil 3.

Once the heat-activated or heat-reactivated adhesive has hardened sufficiently to hold the stud, the actuating cylinder 7 moves the housing 1 to the opposite position, away from the workpiece 35, by means of the carriage 5. During this process the compression spring 24 is released while it holds the assembly 2 in contact with the adhesive flange 29 until it reaches the extended end position in which the guide pins 11 rest at the opposite ends of the guide slots 12. After that, the motion of the housing 1 carries the assembly 2 along with it, so that the assembly 2 also separates from the workpiece 35, and the stud 28 exits the bore 27 of the shield tube 26. The robot can then move the fastening device to a feed device to receive a new stud and subsequently move it to another fastening location.

Figure 2:
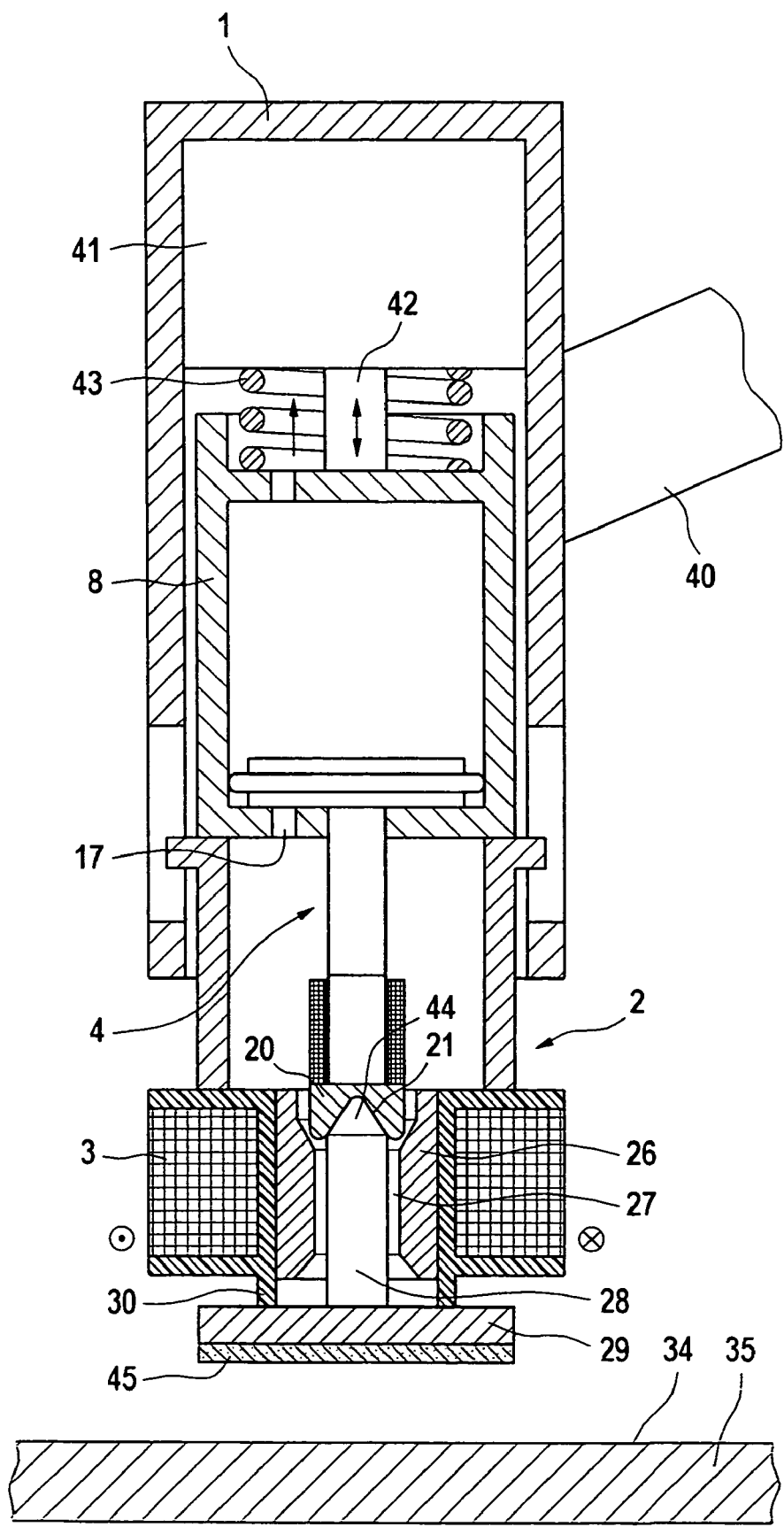
FIG. 2 is a second embodiment of a fastening device according to the invention with a housing that is supported on a robot arm in a rotatable manner.

The fastening device shown in FIG. 2 is the same as the fastening device from FIG. 1 except for the details described below. For this reason, identical reference numbers are used for identical parts. This also applies to the embodiments shown in FIGS. 3 through 7.

The housing 1 of the fastening device shown in FIG. 2 is attached to a robot arm 40 such that no relative motion between the housing 1 and the robot arm 40 is possible along the housing axis. The connection to the robot arm 40 is preferably accomplished by means of a rotary bearing with an axis of rotation perpendicular to the longitudinal axis of the housing, wherein a drive can be provided for defined rotation of the housing 1 relative to the robot arm 40. Provision can also be made to fix the rotary bearing in a previously defined position of the housing 1. If motion of the housing 1 relative to the robot arm 40 is not necessary, the housing 1 can also be rigidly attached to the robot arm 40.

The housing 1 in FIG. 2 has a linear motor 41 located in the closed end of the housing 1 to move the assembly 2. The linear motor 41 is connected to the actuating cylinder 8 of the assembly 2 by a drive shaft 42. In addition, located between the linear motor 41 and the actuating cylinder 8 is a spring 43 that attempts to push the assembly 2 toward the linear motor 41.

FIG. 2 shows the fastening device in a position in which a new stud 28 is being moved toward the mounting surface 34 of a workpiece 35. The stud 28 is located in the bore 27 of the shield tube 26 and is held in this position by the guide element 20, designed as an electromagnet, of the holding device 4. The end of the stud 28, provided here with a pointed tip 44, engages the recess 21 and is thereby centered in the shield tube 26. The magnetic force exerted by the electromagnet of the guide element 20 presses the adhesive flange 29 against the support ring 30. The contact pressure can be further increased if necessary by moderate application of pressure to the working chamber 15.

The linear motor 41 is actuated to press the adhesive flange 29 of the stud 28 against the mounting surface 34. In so doing, said linear motor overcomes the force of the spring 43 and pushes the assembly 2 downward out of the housing 1 until the surface of the adhesive flange 29 that is coated with adhesive 45 rests against the mounting surface 34. During the subsequent bonding process wherein the adhesive 45 is heated, the contact pressure of the adhesive flange can be regulated as desired by actuating the linear motor 41.

Figure 3:
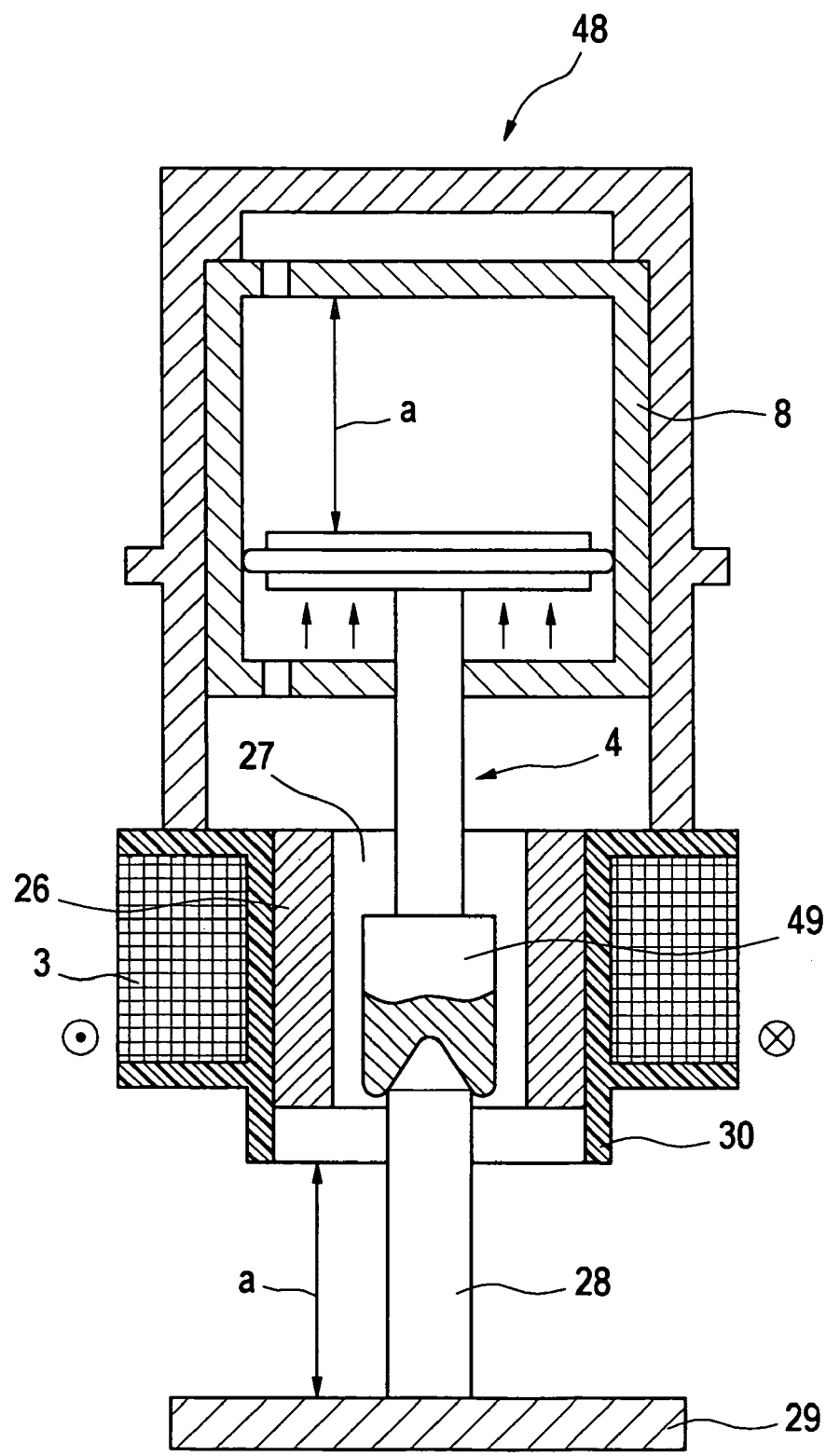
FIG. 3 is a first modified embodiment of the inner assembly of a fastening device according to the invention from FIG. 1 or 2.

FIG. 3 shows an assembly 48 that can be used instead of the assembly 2 in a housing 1 of the devices shown in FIGS. 1 and 2. The assembly 48 differs from the assembly 2 in that a guide element 49, consisting here of a permanent magnet, can be moved through the bore 27 of the shield tube 26 in order to grip the pointed end of a stud 28 located outside the bore 27 and draw it into the bore 27 of the shield tube 26 until its adhesive flange 29 rests against the support ring 30. In this case, the stud 28 is received solely by a movement of the holding device 4, so that an additional motion of the assembly 48 during stud feeding can be eliminated.

Figure 4:
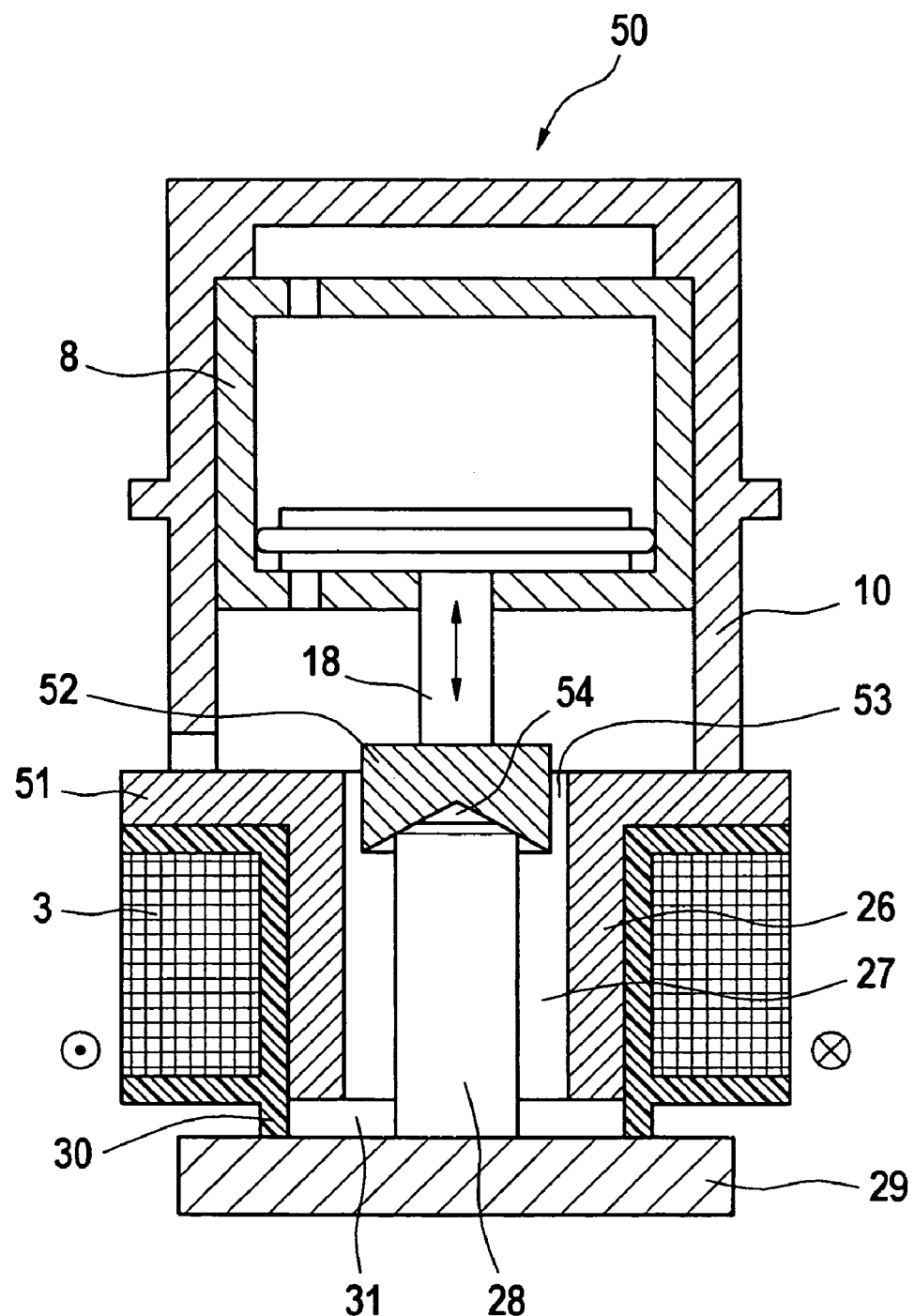
FIG. 4 is a second modified embodiment of the inner assembly of a fastening device according to the invention from FIG. 1 or 2.

FIG. 4 shows an embodiment of an assembly 50 wherein the induction coil 3 can produce the magnetic force needed to hold the adhesive flange 29 of a stud 28. Here, the shield tube 26 has, on the side facing the intermediate member 10, an annular flange 51 extending radially that increases the concentration of the magnetic field at the inside end of the shield tube 26. The annular flange 51 consists of the same magnetically soft material as the shield tube 26. A magnetically soft guide element 52 is arranged in the bore 27 of the shield tube 26 in the vicinity of the annular flange 51 in order to effectively direct the magnetic field into the stud 28. The outside diameter of the guide element 52 is dimensioned large enough that the air gap 53 between the shield tube 26 and the guide element 52 is significantly smaller than the resulting air gap 31 between the bottom end of the shield tube 26 and the adhesive flange 29 resting against the support ring 30. Furthermore, as in the previous example embodiments, the guide element 52 has a conical recess 54 by which the stud end engaging the recess is centered.

The induction coil 3 is connected to a DC voltage source to hold a stud 28. This generates a static magnetic field, which produces a holding force that pulls the stud 28 into the shield tube 26 and holds it in the position shown as a result of the described design of the shield tube 26, annular flange 51 and guide element 52. Of course, this requires the stud 28, including the adhesive flange 29, to be made of a magnetically conducting material such as steel.

As in the previous example embodiments, the guide element 52 is attached to the piston rod 18 of the actuating cylinder 8. The guide element 52 is withdrawn from the shield tube 26 for heating of the adhesive zone. This restores the shielding effect of the shield tube 26 and prevents the alternating magnetic field from excessively heating the shank of the stud 28.

The assembly 50 is characterized by a simple design, and permits secure holding of studs as well as components of different shapes, since a relatively strong static magnetic field can be produced with the aid of the induction coil. When the assembly 50 is in the fastening position, the adhesive flange 29 of the stud 28 is pressed against the mounting surface of the workpiece by the assembly 50 via the support ring 30 and is held in place by this means. The induction coil 3 can thus now be disconnected from the DC voltage source and connected to an AC voltage source to heat the fastening zone.

Figure 5:
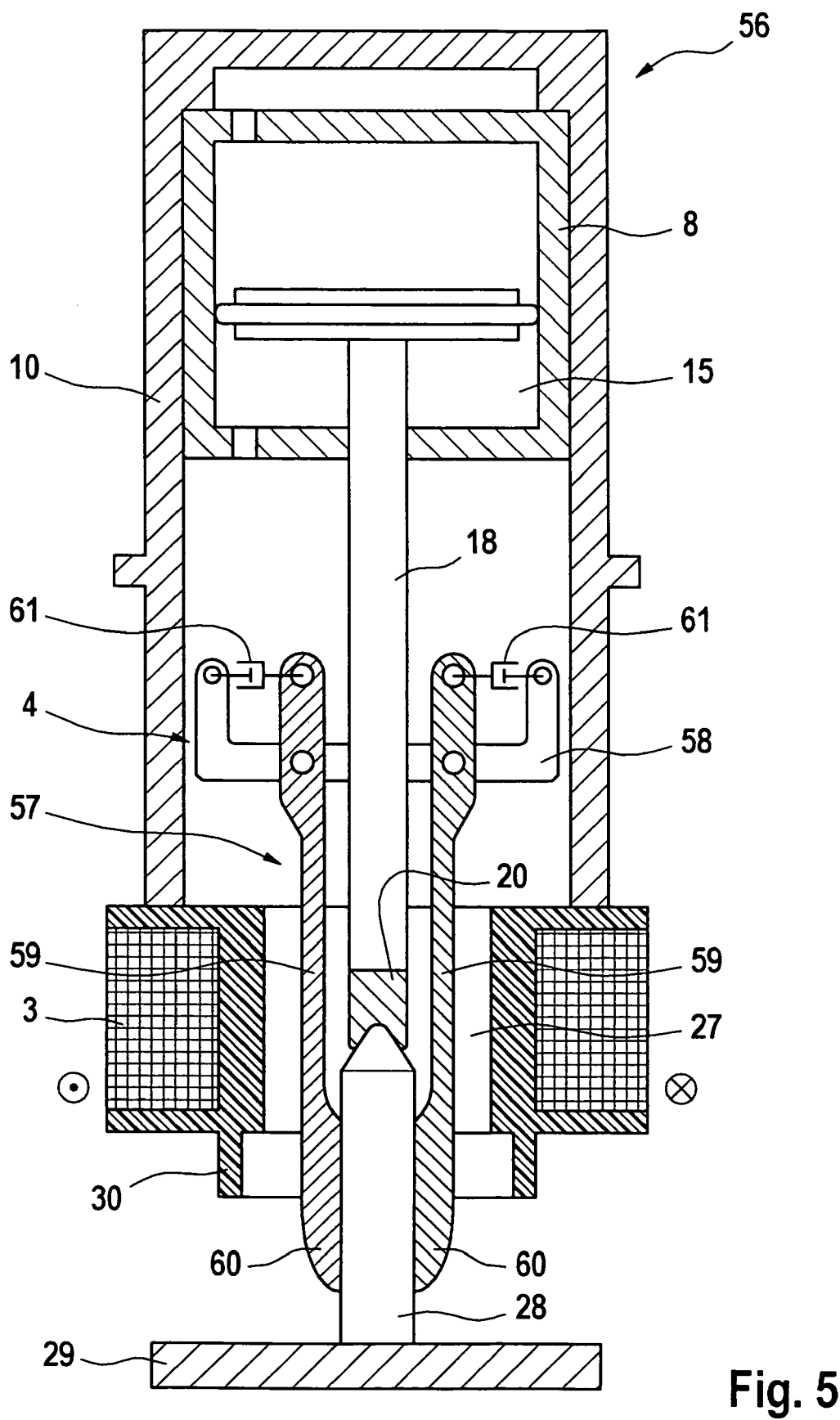
FIG. 5 is a third modified embodiment of the inner assembly of a fastening device according to the invention from FIG. 1 or 2.

FIG. 5 shows an assembly 56 for use in the housing 1 wherein the holding device 4 is provided with a gripper 57 to grip and hold a stud 28. The gripper 57 is arranged on the piston rod 18 that carries the guide element 20. Within the intermediate member 10, the gripper has a gripper frame 58 attached to the piston rod 18 on which are hinge-jointed two opposing double-armed gripper arms 59. The gripper arms 59 extend essentially parallel to the piston rod 18, and their ends, which form retaining jaws 60, project past the guide element 20 located at the end of the piston rod 18. The ends of the gripper arms 59 opposite the retaining jaws 60 are each connected to the gripper frame 58 by a pneumatic or electric drive 61.

In the position shown, the gripper 57 has moved almost all the way down and has gripped a stud 28. The pointed upper end of the stud 28 is supported on the guide element 20. The guide element 20 here can be designed advantageously as a proximity sensor in order to be able to detect the presence of the stud 28 in the gripper 57. Through the application of pressure to the working chamber 15 of the actuating cylinder 8, the closed gripper 57 is moved upward and the stud 28 is drawn into the bore 27 inside the induction coil 3 until the adhesive flange 29 rests against the support ring 30. In this holding position, the stud 28 is then transported to the fastening position, where the bonding process is then initiated. Once an adhesive bond has been produced, the gripper 57 is opened so that the assembly 56 can be removed from the stud 28 without transmitting any force to it.

A passive gripper that is held in the closed position by spring force can also be used instead of the active gripper 57 to hold a stud. However, with such a gripper it is necessary for the gripper to be pulled off the stud using the actuating cylinder 8 while the support ring of the assembly rests against the adhesive flange. A correspondingly longer travel distance for the gripper is then necessary.

Figure 6:
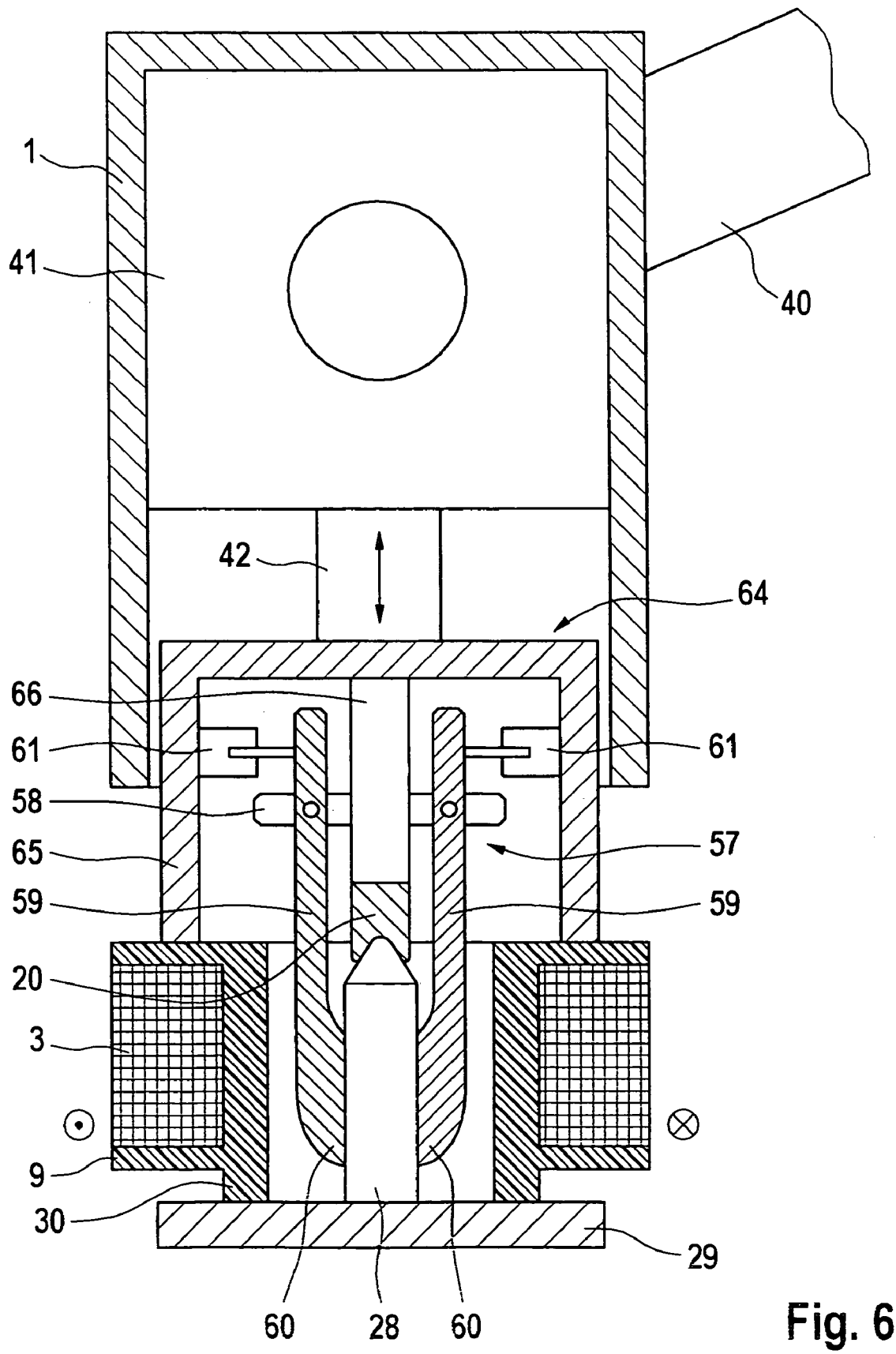
FIG. 6 is an embodiment of the fastening device according to the invention with a holding device rigidly arranged on the inductor.

FIG. 6 shows an embodiment of a fastening device according to the invention that is characterized by simple construction and small overall length. The housing 1, which is rotatably arranged on a robot arm 40, has located within it an assembly 64 that moves in the longitudinal direction of the housing by means of a linear motor 41. The assembly 64 consists of a coil carrier 9 with an induction coil 3 and a cup-shaped end piece 65 fastened thereto. Located in the center of the end piece 65 is a rod 66, which carries a gripper 57 with a gripper frame 58 and gripper arms 59, and at its end a guide element 20. The gripper arms 59 can be moved by drives 61 that are attached to the wall of the end piece 65. The retaining jaws 60 of the gripper arms 59 are located within the bore 27 of the coil carrier 9.

In the case of the assembly 64, the gripper 57 is not movable along the coil axis in the assembly 64. Therefore, in order to grip a stud 28 the linear motor 41 is used to push the assembly 64 with opened gripper 57 over the stud, which for example rests with its adhesive flange on a support, until the support ring 30 rests against the adhesive flange 29. Once the gripper 57 is closed to grip the stud 28, the assembly 64 is retracted into the housing 1 so that it can be extended again at the fastening position to set and press the adhesive flange 29 on the mounting surface 34.

Figure 7:
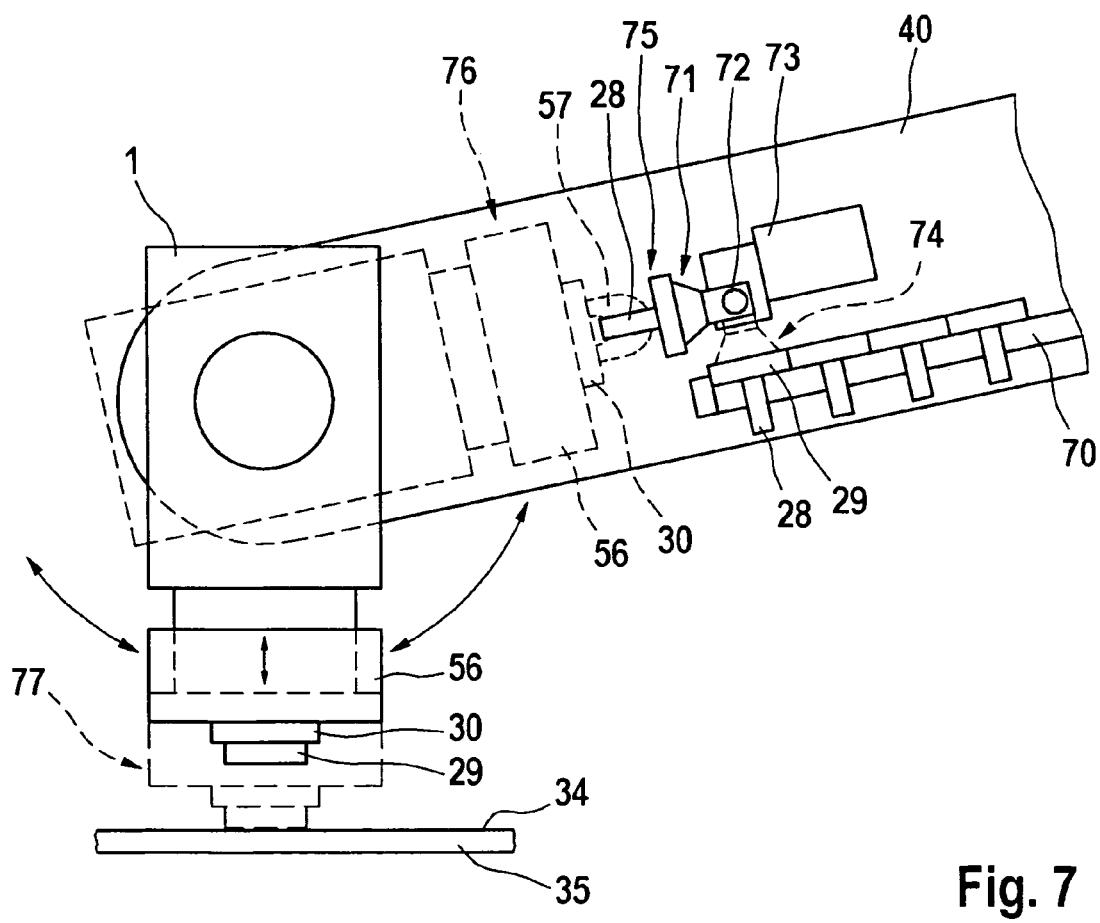
FIG. 7 is a device arranged on a robot arm for feeding adhesive studs to a fastening device according to the invention.

FIG. 7 shows an advantageous fastening device for feeding mounting studs and similar components to a fastening device according to the invention. The housing 1 of the fastening device here is rotatably arranged at the end of a robot arm 40 and can be moved to any of various desired angular positions by means of a drive. Located on the robot arm 40 is a feed device 70 that feeds the studs 28 to a delivery point 71. Provided at the delivery point 71 is a feed gripper 72, which is magnetic for example, that can be moved by a pivot drive 73 back and forth between a receiving position 74 and a delivery position 75. In the receiving position 74, the feed gripper 72 grips one stud 28 at a time by the adhesive flange 29 and holds it at the delivery position 75 in such an orientation that the free end of the stud 28 points toward the axis of rotation of the housing 1.

In order to feed the stud 28 to the fastening device, the housing 1, for example with the assembly 56 located therein, is pivoted to the feed position 76, indicated by dashed lines, where the coil carrier of the assembly 56 is located opposite the stud 28 in the delivery position and is oriented coaxial thereto. The actuating cylinder of the assembly 56 is actuated to extend the gripper 57, grip the stud 28, and draw it into the assembly 56 until its adhesive flange rests against the support ring 30. After this process, the feed gripper 72 returns to the receiving position 74. At the same time, the robot arm 40 is moved to the fastening position and the housing 1 on the robot arm 40 is pivoted to the fastening position, in which its longitudinal axis is perpendicular to the mounting surface 34 of a workpiece 35. Moving the assembly 56 to the position 77 shown by dashed lines presses the adhesive flange 29 of the stud against the mounting surface 34, and the bonding process is then initiated.

The feed device shown in FIG. 7 can also be used in combination with the other assemblies described above. If the holding device cannot be extended from the assembly, the induction coil of the assembly must instead be pushed axially onto the shank of the stud far enough that the holding device can grip and hold the stud.

What is claimed is:

1. A fastening device for fastening a component provided with an adhesive flange to a mounting surface using a heat-activated adhesive that creates an adhesive bond between the component and the mounting surface, the fastening device comprising:
   a coil carrier having a through bore;
   a holding device extendable into the through bore including an electromagnet operable to create a holding force to hold a first end of the component when the fastening device is positioned in a bonding position, the first end being insertable into the through bore from outside the fastening device until a second end of the component defining a bearing surface larger than the through bore is oriented facing the mounting surface; and an induction coil positioned on the coil carrier operable when energized to inductively heat the component and the adhesive;

wherein the holding device is retractable from the component following creation of the adhesive bond.

2. The fastening device of claim 1, further comprising a DC voltage source connectable to the induction coil at least during the holding phase.

3. The fastening device of claim 1, wherein the holding device further comprises a guide element positionable in the through bore.

4. The fastening device of claim 3, wherein the guide element comprises a magnetically soft material operable to concentrate a magnetic field to magnetically hold the component during the holding phase.

5. The fastening device of claim 4, comprising an actuating device operable to move the guide element out of the through bore.

6. The fastening device of claim 5, wherein the guide element comprises a magnetically weak plastic material.

7. The fastening device of claim 5, wherein the guide element comprises an electromagnet.

8. The fastening device of claim 5, wherein the guide element comprises a permanent magnet.

9. The fastening device of claim 3, comprising:
an actuating cylinder oriented coaxial to the induction coil and connected thereto; and
a piston rod slidably received in the actuating cylinder;
wherein the guide element is fastened to an end of the piston rod.

10. The fastening device of claim 1, wherein the holding device comprises a gripper having gripper arms projecting into the induction coil through bore.

11. The fastening device of claim 10, comprising a guide element wherein the gripper is connected to the guide element.

12. The fastening device of claim 11, further comprising an actuating device wherein the gripper is moveable along a direction of an axis of the coil by the actuating device.

13. The fastening device of claim 12, further comprising a drive, wherein the gripper arms are moveable between an open position and a closed position by the drive.

14. The fastening device of claim 1, further comprising:
a support ring axially extending from the coil carrier;
wherein the holding mechanism is operable to draw a flanged end of the component into contact with the support ring when the fastening device is positioned in the bonding position.

15. The fastening device of claim 1, comprising a shield tube made of a magnetically soft material positioned within the through bore having a shield tube bore operable to slidingly receive the first end of the component.

16. A fastening device for fastening a component provided with an adhesive flange to a mounting surface using a heat-activated adhesive that creates an adhesive bond between the component and the mounting surface, comprising:
an induction coil retained by a coil carrier, the induction coil operable to heat at least one of the component and the adhesive, the induction coil having an axis;
a holding device operable to hold a first end of the component when the fastening device is positioned in a bonding position, the first end being insertable into a through bore of the induction coil from outside the fastening device until a second end of the component defining a bearing surface larger than the through bore is oriented facing the mounting surface; and
a housing having the holding mechanism displaceably positioned therein, the induction coil and the holding device together defining an assembly supported by the housing to be movable along the axis between two end positions;
wherein the holding device is operable to temporarily hold the component in contact with the coil carrier with a holding force directed toward the bearing surface.

17. The fastening device of claim 16, wherein the holding device further comprises:
a guide element operable to contact the component; and
a coil positioned proximate to the guide element, the coil operable to generate a magnetic field through the guide element to magnetically hold the component in contact with the guide element.

18. The fastening device of claim 17, further comprising:
a through bore of the coil carrier;
a conical shaped male end of the component; and
a conical shaped female recess created in the guide element operable to receive the conical shaped male end of the component and adapted to center the component within the through bore of the coil carrier.

19. The fastening device of claim 18, comprising:
an intermediate member positioned between the housing and the coil carrier; and
at least one guide pin extending outwardly from the intermediate member, the guide pin slidably positioned within a longitudinal slot created in the housing, the guide pin operable to allow longitudinal motion of the assembly along the axis and prevent rotation of the assembly about the axis.

20. The fastening device of claim 16, further comprising a biasing device positioned between the assembly and the housing, the biasing device operable to bias the assembly toward one of the two end positions.

21. The fastening device of claim 16, comprising a linear motor drive operable to move the assembly to each of the two end positions.

22. The fastening device of claim 16, comprising a clamping fixture, wherein the assembly is operably held in at least one of the end positions by the clamping fixture.

23. A fastening device for fastening components provided with an adhesive flange to a mounting surface using a heat-activated adhesive that creates an adhesive bond between the component and the mounting surface, comprising:
an induction coil retained by a coil carrier, the induction coil operable to heat at least one of the component and the adhesive, the induction coil having an axis;
a holding device operable to releasably hold a first end of the component when the fastening device is positioned in a bonding position, the first end being insertable into a through bore of the induction coil from outside the fastening device until a second end of the component defining a bearing surface larger than the through bore is oriented facing the mounting surface; and
a housing having the holding mechanism displaceably positioned therein, the induction coil and the holding device together defining an assembly supported by the housing to be movable along the axis between two end positions; and
a robot having an arm, the housing being one of rigidly or movably attached to the arm of the robot;

wherein the holding device is operable to temporarily hold the component in contact with the coil carrier with a holding force directed toward the bearing surface and the robot is operable to move the assembly to the bonding position.

24. The fastening device of claim 23, further comprising:
a carriage guide fixedly connected to the robot arm; and
a carriage connected to the housing the carriage longitudinally movable with respect to the carriage guide parallel to the axis.

25. The fastening device of claim 23, further comprising a rotary drive, the housing supported on the robot arm rotatable about an axis oriented transverse to the coil axis and moveable to different angular positions and locked in any of the different angular positions by the rotary drive.

26. The fastening device of claim 23, further comprising a feed device connectable to the robot arm, the fastening device on the robot arm being pivotable to a loading position in which a next component is operably fed into the holding device.

27. A method for adhesively fastening a component having an adhesive to a mounting surface using an induction coil connected to a coil carrier, a holding device, and a housing, the method comprising:
supporting the induction coil and the holding device together defining an assembly from the housing, the assembly movable along an axis of the induction coil between two end positions;
creating a holding force using the holding device to temporarily hold the component in contact with the holding device;
moving the assembly and the component until the component contacts the mounting surface;
energizing the induction coil to heat at least one of the component or the adhesive; and
inserting a first end of the component into a through bore of the induction coil from outside the fastening device until a second end of the component defining a bearing surface larger than the through bore is oriented facing the mounting surface prior to the creating operation.

28. The method of claim 27, further comprising energizing a magnet during the creating operation to generate the holding force.

29. The method of claim 27, further comprising connecting a magnet to the holding device prior to the creating operation.

30. The method of claim 27, further comprising:
de-energizing the induction coil after an adhesive bead is created following the energizing operation; and
retracting the holding device from the component.

* * * * *